(12) United States Patent
Ogino

(10) Patent No.: US 10,317,866 B2
(45) Date of Patent: Jun. 11, 2019

(54) STATE CHANGE MANAGEMENT SYSTEM FOR MANUFACTURING CELL IN CELL CONTROL SYSTEM

(71) Applicant: FANUC Corporation, Yamanashi (JP)

(72) Inventor: Hideo Ogino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 37 days.

(21) Appl. No.: 15/378,303

(22) Filed: Dec. 14, 2016

(65) Prior Publication Data

US 2017/0176968 A1  Jun. 22, 2017

(30) Foreign Application Priority Data

Dec. 21, 2015 (JP) .................................. 2015-248543

(51) Int. Cl.
*G05B 19/04* (2006.01)
*G05B 19/042* (2006.01)
*G05B 19/418* (2006.01)

(52) U.S. Cl.
CPC ..... *G05B 19/0426* (2013.01); *G05B 19/4188* (2013.01); *G05B 2219/31069* (2013.01); *G05B 2219/35204* (2013.01); *Y02P 90/14* (2015.11); *Y02P 90/20* (2015.11); *Y02P 90/24* (2015.11)

(58) Field of Classification Search
None
See application file for complete search history.

(56) References Cited

U.S. PATENT DOCUMENTS

| 5,185,708 A * | 2/1993 | Hall ...................... G05B 19/058 340/3.4 |
| 5,247,447 A * | 9/1993 | Korncoff ............ G05B 19/4184 700/108 |
| 5,574,637 A * | 11/1996 | Obata .............. G05B 19/41835 700/2 |

(Continued)

FOREIGN PATENT DOCUMENTS

| CN | 103368757 A | 10/2013 |
| CN | 103700031 A | 4/2014 |
| CN | 103700032 A | 4/2014 |
| CN | 104156822 A | 11/2014 |
| CN | 104574191 A * | 4/2015 |

(Continued)

OTHER PUBLICATIONS

Decision to Grant a Patent in JP Patent Application No. 2015-248543, dated Jan. 24, 2017.

(Continued)

*Primary Examiner* — Jason Lin
(74) *Attorney, Agent, or Firm* — Hauptman Ham, LLP

(57) ABSTRACT

A state change management system of a manufacturing cell in a cell control system receives, from the manufacturing cell, event information items in different forms generated in multiple manufacturing machines constituting a manufacturing cell, via a communication device, to thereby monitor the changes in the states of the multiple manufacturing machines. Moreover, the state change management system converts the received event information items in the different forms into a standardized form, and outputs the event information items in the standardized form to a production planning device that performs production planning of a product manufactured by the manufacturing cell via the communication device.

6 Claims, 8 Drawing Sheets

(56) References Cited

U.S. PATENT DOCUMENTS

| | | | | |
|---|---|---|---|---|
| 2002/0147523 | A1* | 10/2002 | Kiesel | G05B 19/042 700/181 |
| 2003/0083756 | A1* | 5/2003 | Hsiung | G05B 15/02 700/28 |
| 2004/0128027 | A1* | 7/2004 | Groll | G05B 19/05 700/245 |
| 2005/0187964 | A1* | 8/2005 | Nakamura | G06F 17/30675 |
| 2006/0255926 | A1* | 11/2006 | Okada | G08B 26/00 340/505 |
| 2007/0171041 | A1* | 7/2007 | Kakimoto | G05B 23/0272 340/506 |
| 2008/0125887 | A1* | 5/2008 | Case | G05B 23/0272 700/83 |
| 2012/0101600 | A1* | 4/2012 | Schrier | G05B 23/027 700/80 |
| 2013/0116821 | A1* | 5/2013 | Joly | B25J 9/161 700/254 |

FOREIGN PATENT DOCUMENTS

| | | |
|---|---|---|
| CN | 104574191 A | 4/2015 |
| EP | 0100684 A2 | 2/1984 |
| JP | 59-27308 A | 2/1984 |
| JP | 5-40507 A | 2/1993 |
| JP | H05253813 A | 10/1993 |
| JP | H06309011 A | 11/1994 |
| JP | H10320011 A | 12/1998 |
| JP | 11-231924 A | 8/1999 |
| JP | 2011-186517 A | 9/2011 |

OTHER PUBLICATIONS

Office Action in CN Application No. 2016111836675, dated Mar. 27, 2018, 14pp.

Office Action in CN Application No. 201611183667.5, dated Jul. 30, 2018, 15pp.

* cited by examiner

FIG. 2

EVENT INFORMATION TABLE (CELL A, MACHINING CENTER 1)

| MANAGEMENT NUMBER | NUMBER OR ATTRIBUTE | MESSAGE | DATE AND TIME OF GENERATION |
|---|---|---|---|
| 001 | 308 | APCアラーム：1軸バッテリ電圧低下 | 平成27年10月20日 午前8時46分39秒 |
| 002 | I/O124 | 工具交換T24 | 平成27年10月21日 午後4時12分51秒 |
| 003 | ... | ... | ... |

EVENT INFORMATION TABLE (CELL A, LATHE 1)

| MANAGEMENT NUMBER | NUMBER OR ATTRIBUTE | MESSAGE | DATE AND TIME OF GENERATION |
|---|---|---|---|
| 001 | PS0011 | IMPROPER NC-ADDRESS | '15/10/20 11:46:09 P.M. |
| 002 | SL1400 | O1400 HAS BEEN SELECTED | '15/10/22 08:29:43 A.M. |
| 003 | ... | ... | ... |

EVENT INFORMATION TABLE (CELL A, ROBOT 1)

| MANAGEMENT NUMBER | NUMBER OR ATTRIBUTE | MESSAGE | DATE AND TIME OF GENERATION |
|---|---|---|---|
| 001 | RESET | リセット | 2015/09/10 13:47:58 |
| 002 | EX-224 | ブンキデキマセン | 2015/10/23 23:19:08 |
| 003 | ... | ... | ... |

FIG. 3

EVENT CLASSIFICATION TABLE 131

| CLASSIFICATION NUMBER | NUMBER OR ATTRIBUTE | TYPE OF EVENT |
|---|---|---|
| 001 | 308 | WARNING |
| 002 | I/O124 | EVENT |
| 003 | PS0011 | ALARM |
| 004 | SL1400 | EVENT |
| 005 | ... | ... |

FIG. 4

LANGUAGE CONVERSION TABLE 132

| MESSAGE ID | STANDARD LANGUAGE | LANGUAGE 1 | LANGUAGE 2 |
|---|---|---|---|
| 001 | アドレス入力に誤りがあります | IMPROPER NC-ADDRESS | ― |
| 002 | O1400が選択されました | O1400 HAS BEEN SELECTED | ― |
| 003 | リセットされました | ― | ﾘｾｯﾄ |
| 004 | 分岐できません | ― | ﾌﾞﾝｷﾃﾞｷﾏｾﾝ |
| 005 | ... | ... | ... |

FIG. 5

STANDARDIZED EVENT INFORMATION TABLE ~133

| MANAGEMENT NUMBER | NAME OF MANUFACTURING CELL | NAME OF MANUFACTURING MACHINE | TYPE OF EVENT | NUMBER OR ATTRIBUTE | MESSAGE | DATE AND TIME OF GENERATION |
|---|---|---|---|---|---|---|
| 001 | CELL A | ROBOT 1 | WARNING | RESET | リセットされました | 2015/09/10 13:47:58 |
| 002 | CELL A | MACHINING CENTER 1 | WARNING | 308 | APCアラーム: 1軸バッテリ電圧低下 | 2015/10/20 08:46:39 |
| 003 | CELL A | LATHE 1 | ALARM | PS0011 | アドレス入力に誤りがあります | 2015/10/20 23:46:09 |
| 004 | CELL A | MACHINING CENTER 1 | EVENT | I/O124 | 工具交換T24 | 2015/10/21 16:12:51 |
| 005 | CELL A | LATHE 1 | EVENT | SL1400 | O1400が選択されました | 2015/10/22 08:29:43 |
| 006 | CELL A | ROBOT 1 | ALARM | EX-224 | 分岐できません | 2015/10/23 23:19:08 |
| 007 | ... | ... | ... | ... | ... | ... |

- REGISTER NAME OF MANUFACTURING CELL AND NAME OF MANUFACTURING MACHINE
- CONVERT NUMBER OR ATTRIBUTE INTO TYPE OF EVENT BASED ON EVENT CLASSIFICATION TABLE AND REGISTER THEREOF (ALSO REGISTER NUMBER OR ATTRIBUTE AS-IS AS PRELIMINARY INFORMATION)

- CONVERT MESSAGES INTO THOSE IN STANDARD LANGUAGE (JAPANESE IN THESE EXAMPLES) BASED ON LANGUAGE CONVERSION TABLE AND REGISTER THEREOF

- CONVERT DATE AND TIME OF OCCURRENCE INTO THOSE IN CHRISTIAN YEAR AND ON 24-HOUR BASIS AND REGISTER THEREOF
- SORT ITEMS IN ORDER OF TIME POINT

STATE CHANGE MANAGEMENT SYSTEM FOR MANUFACTURING CELL IN CELL CONTROL SYSTEM

RELATED APPLICATIONS

The present application claims priority to Japanese Patent Application Number 2015-248543, filed Dec. 21, 2015, the disclosure of which is hereby incorporated by reference herein in its entirety.

BACKGROUND OF THE INVENTION

Field of the Invention

The present invention relates to a state change management system for a manufacturing cell, and in particular, relates to a state change management system for a manufacturing cell in a cell control system that manages a manufacturing cell composed of multiple manufacturing machines.

Description of the Related Art

In a manufacturing cell operating in a large factory, multiple, different kinds of manufacturing machines, such as machine tools, robots or PLCs, are installed. A cell control system obtains various kinds of device-based or product-based manufacturing information items from those multiple manufacturing machines constituting the manufacturing cell, and the obtained manufacturing information items are used for various management tasks required in manufacturing, such as process management, quality management and safety management.

An example of the cell control system according to a conventional art will be described using FIG. 9.

A cell control system 10 includes at least one cell controller 11 that manages a manufacturing cell. The cell controller 11 includes a manufacturing management part 12, a storage device 13 and a communication device 14. The manufacturing management part 12 receives device-based or product-based manufacturing information items from multiple manufacturing machines 21 installed in a manufacturing cell 20 via the communication device 14, sorts out the received process-based manufacturing information based on information related to processes stored in the storage device 13 in advance, or gives determination results, which are based on information related to safety standards stored in the storage device 13, to the received manufacturing information items, to organize thereof as cell-based manufacturing information, and stores the organized cell-based manufacturing information in the storage device 13. Further, the manufacturing management part 12 transmits the manufacturing information stored in the storage device 13 to a production planning device 30 via the communication device 14.

As a conventional art related to the cell control system, for example, in Japanese Patent Application Laid-Open No. 05-253813, with the aim of speedy communication of messages and prevention of leakage in message communication, a technique is disclosed in which a message is inputted from a cell controller to an initial screen of a numerical controller when power is turned on, to thereby cause the initial screen to display the message every time the power is turned on or in every break time.

Moreover, in Japanese Patent Application Laid-Open No. 10-320011, with the aim of making development of a cell control system and changes thereof with ease, and responding flexibly to change or addition of tasks, there is disclosed a technique including an execution control module that performs description and interpretation of procedures of tasks and a functional module that executes information processing or equipment operation necessary for the tasks, to thereby execute the tasks according to messages sent from the execution control module.

Further, in Japanese Patent Application Laid-Open No. 6-309011, with the aim of saving the effort of creating programs independently for respective appliances and providing an integrated program interface, a technique is disclosed in which operation software for a manufacturing cell is procedurally described in one programming language.

Multiple manufacturing machines installed in a factory are, in general, controlled by respective controllers produced by different manufacturers. Moreover, in some cases, even the manufacturing machines of the same type (for example, machine tools) in a manufacturing cell are controlled by controllers produced by different manufacturers, and in some other cases, further, even the controllers produced by the same manufacturer are of different models.

Therefore, in a manufacturing cell, various kinds of event information items, such as alarms, warnings or changes in machining conditions (for example, tool exchange or changes in main program selection) generated in a controller for controlling manufacturing machines, are displayed in different formats on indicators provided in the respective controllers, and are notified to the cell controller in many cases. Further, if manufacturing countries of the controllers are different, the various kinds of event information items are indicated and notified in different languages in some cases.

As described above, since the formats or languages of the various kinds of event information items, such as alarms, warnings and changes in machining conditions, collected by the cell control system are different by the respective manufacturing machines and are not standardized, it is inefficient to collect the event information items from the manufacturing machines, and then summarize and manage as cell-based information. Moreover, since handling of the collected information is complicated, when maintenance or change of the cell control system is needed, it takes time to address, and sometimes becomes difficult to easily accomplish maintenance or change.

Against such a problem, the technique described in the foregoing Japanese Patent Application Laid-Open No. 05-253813 transfers a common message to all of the numerical controllers connected to the cell controller to make the numerical controllers indicate the common message; however, the technique does not standardize the messages generated from the different numerical controllers and does not collect standardized messages on the cell controller side.

Moreover, in the technique described in the foregoing Japanese Patent Application Laid-Open No. 10-320011, the cell controller is able to flexibly respond to change or addition of tasks; however, the technique does not standardize messages generated from the different controllers to be collected on the cell controller side.

Further, the technique described in the foregoing Japanese Patent Application Laid-Open No. 6-309011 is configured to save the effort of creating programs independently corresponding to manufacturing machines controlled by controllers of different languages, such as the robot language, the ladder chart and the C language; however, the technique does not standardize messages generated from the different controllers to be collected on the cell controller side.

SUMMARY OF THE INVENTION

Therefore, an object of the present invention is to provide a state change management system of a manufacturing cell in a cell control system that makes it possible to efficiently summarize and manage event information items generated in multiple manufacturing machines in a manufacturing cell as manufacturing cell-based event information.

In a state change management system of a manufacturing cell in a cell control system according to the present invention, the cell control system is connected via a communication device to a manufacturing cell composed of multiple manufacturing machines including at least one of a robot, a PLC, and a machine tool for manufacturing a product, and to a production planning device that performs production planning of the product manufactured by the manufacturing cell. Then, the state change management system includes: an event information monitoring part that receives, from the manufacturing cell, event information items in different forms generated from the multiple manufacturing machines, the event information items including at least one of an alarm, a warning and a change in machining condition, to thereby monitor a state change in the multiple manufacturing machines; a standard information creation part that executes a process of converting the event information items in the different forms received by the event information monitoring part into a standardized form, the process including a process of standardizing formats and a process of standardizing languages; and a standard information output part that outputs event information in a standardized form created by the standard information creation part to the production planning device.

According to the present invention, since various kinds of event information items, such as the alarms, the warnings and the changes in machining conditions (for example, tool exchange or selection of, or changes in, a main program), generated in the multiple manufacturing machines in the manufacturing cell are collected by the cell control system as information items whose formats or languages are standardized, the cell controller is capable of efficiently summarize and manage the information items as manufacturing cell-based event information. Moreover, since handling of data is simplified, it becomes easy to accomplish maintenance or change of the cell control system. Further, since the manufacturing cell-based information items to be transmitted to the production planning device are standardized, information sharing or coordination among the manufacturing cells in the production planning device can be easily performed.

BRIEF DESCRIPTION OF THE DRAWINGS

The foregoing and other objects and features of the present invention will become apparent from the following description of the embodiment in connection with the accompanying drawings, wherein:

FIG. 2 shows examples of an event information table provided in a storage device in the cell control system in FIG. 1;

FIG. 3 shows an example of an event classification table provided in the storage device in the cell control system in FIG. 1;

FIG. 4 shows an example of language conversion table provided in the storage device in the cell control system in FIG. 1;

FIG. 5 shows an example of a standardized event information table provided in the storage device in the cell control system in FIG. 1;

DETAILED DESCRIPTION OF THE PREFERRED EMBODIMENT

Hereinafter, an embodiment of the present invention will be described with reference to the accompanying drawings. Note that configurations same as or similar to those in the description of the conventional art will be assigned with same signs.

Figure 1:
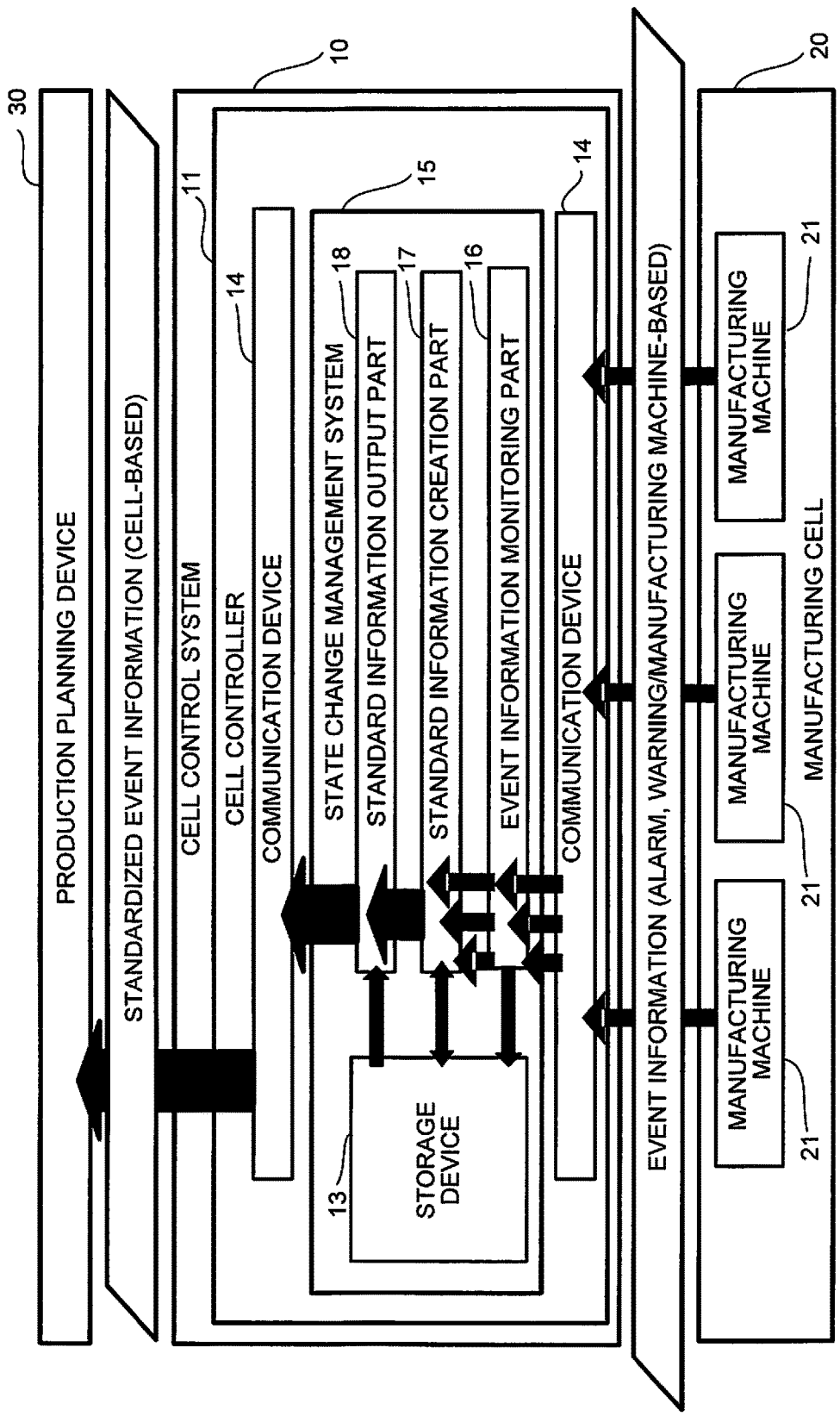
FIG. 1 is a schematic configuration view of a cell control system according to an embodiment of the present invention.

FIG. 1 is a schematic configuration view of a cell control system according to an embodiment of the present invention.

The cell control system 10 includes at least one cell controller 11 that manages a manufacturing cell 20. The cell controller 11 includes a communication device 14 that controls transmission and reception of various kinds of information items with the manufacturing cell 20 and with a production planning device 30, and a state change management system 15 that manages state changes of the manufacturing cell 20 to be managed.

Note that the cell control system 10 may be composed of multiple cell controllers 11. Moreover, multiple manufacturing cells 20 may be connected to the cell control system 10 via the communication device 14.

The state change management system 15 includes a storage device 13, an event information monitoring part 16, a standard information creation part 17 and a standard information output part 18.

The storage device 13 stores various kinds of information items used for management of the manufacturing cell 20, and, in addition to various kinds of tables to be described in the following description, stores information related to the manufacturing cell 20 managed by the state change management system 15. The information related to the manufacturing cell 20 includes information related to a manufacturer, a type and a model of each manufacturing machine 21, information related to a position on a communication line (an IP address or others) of each manufacturing machine 21 and process information of a manufacturing process in the manufacturing cell 20, and these information items can be properly obtained when required by each part (the event information monitoring part 16, the standard information creation part 17 and the standard information output part 18) provided to the state change management system 15.

The event information monitoring part 16 regularly receives event information generated at a constant period in each manufacturing machine 21 in the manufacturing cell 20 in real time or at period different by each manufacturing machine 21 via the communication device 14, and updates an event information table 130 (to be described later) for each manufacturing machine 21 provided in the storage device 13.

FIG. 2 shows examples of the event information table 130 provided in the storage device 13.

In the examples shown in FIG. 2, a manufacturing cell A includes "machining center 1", "lathe 1" and "robot 1" as the manufacturing machines 21. Then, the event information table 130 in the storage device 13 includes an event information table (cell A, machining center 1), an event information table (cell A, lathe 1), and an event information table (cell A, robot 1).

In each event information table 130, for example, information items, such as date and time of occurrence of an event, a message indicating details of the event, and a number or attribute of a target in which the event occurs, of the event occurred in each manufacturing machine 21 are included. In each data included in each information item stored in the event information table 130, the format or the language differs depending on the manufacturer, the type, the model or others of the manufacturing machine 21, as shown in FIG. 2.

The standard information creation part 17 converts the contents of event information tables 130, which are created and updated in respective manufacturing machines 21 and have different formats or languages into information in which the formats or languages, are standardized based on an event classification table 131 (to be described later) and a language conversion table 132 (to be described later) provided in the storage device 13, and summarizes the converted information into a manufacturing cell-based standardized event information table 133 (to be described later) provided in the storage device 13. Note that the manufacturing cell-based standardized event information table 133 may sort the converted information in the order of date and time of occurrence in response to requests from a system administrator or in accordance with settings.

FIG. 3 shows an example of the event classification table 131 provided in the storage device 13.

The event classification table 131 is a table associating the number or attribute data included in each event information item generated in the manufacturing machine 21 with a type of an event. The standard information creation part 17 refers to the event classification table 131 to identify the type of the event from the number or attribute data included in each event information item, and registers the type of the event with the standardized event information table 133. Note that, in some cases, among the multiple manufacturing machines 21 whose manufacturers, types, models or the like are different, the same value of the number or attribute is used in the different type of event; in such a case, an event classification table 131 associating the number or attribute data with the type of the event is prepared for each model of the manufacturing machine 21, and the type of the event may be determined with reference to the event classification table 131 corresponding to the model of the manufacturing machine 21 from which the event information is obtained.

FIG. 4 shows an example of the language conversion table 132 provided in the storage device 13.

The language conversion table 132 is a table associating each message data included in each event information item generated in the manufacturing machine 21 with a message by the standard language. The standard information creation part 17 refers to the language conversion table 132 to identify the message in the standard language corresponding to the message data based on the message data included in each event information item, and registers the message in the standard language with the standardized event information table 133.

Note that, in some cases, among the manufacturing machines 21 whose manufacturers, types, models or the like are different, the same message data is used in different meanings; in such a case, a language conversion table 132 associating the message data with a message in the standard language is prepared for each model of the manufacturing machine 21, and conversion of message may be performed with reference to the language conversion table 132 corresponding to the model of the manufacturing machine 21 from which the event information is obtained.

FIG. 5 shows an example of the standardized event information table 133 provided in the storage device 13.

The standardized event information table 133 is a table for summarizing the standardized event information converted from the event information by the standard information creation part 17. The standardized event information table 133 includes the data items, such as "name of manufacturing cell", "name of manufacturing machine", "type of event", "message" and "data and time of occurrence". With "name of manufacturing cell" and "name of manufacturing machine", the names of the manufacturing cell and the manufacturing machine from which each event information item is obtained are registered. With "type of event", the type of the event converted by the standard information creation part 17 from the number or attribute data included in each event information item is registered, and with "message", the message in the standard language converted by the standard information creation part 17 from the message data included in each event information item is registered. Further, with "date and time of occurrence", the date and time in the standard form, such as, in the Christian year or on a 24-hour basis, converted from the data of the date and time of occurrence included in each event information item are registered. Note that the standardized event information table 133 may be provided with a data item for registering the number or attribute data included in the event information item as-is as preliminary information.

The standard information output part 18 refers to the manufacturing cell-based standardized event information table 133, in which the formats or languages are standardized, stored in the storage device 13 and regularly outputs all information items to the production planning device 30 at a constant period via the communication device 14. Note that, in response to a standardized event information request from the production planning device 30, the standard information output part 18 may output the information stored in the manufacturing cell-based standardized event information table in the storage device 13.

Figure 6:
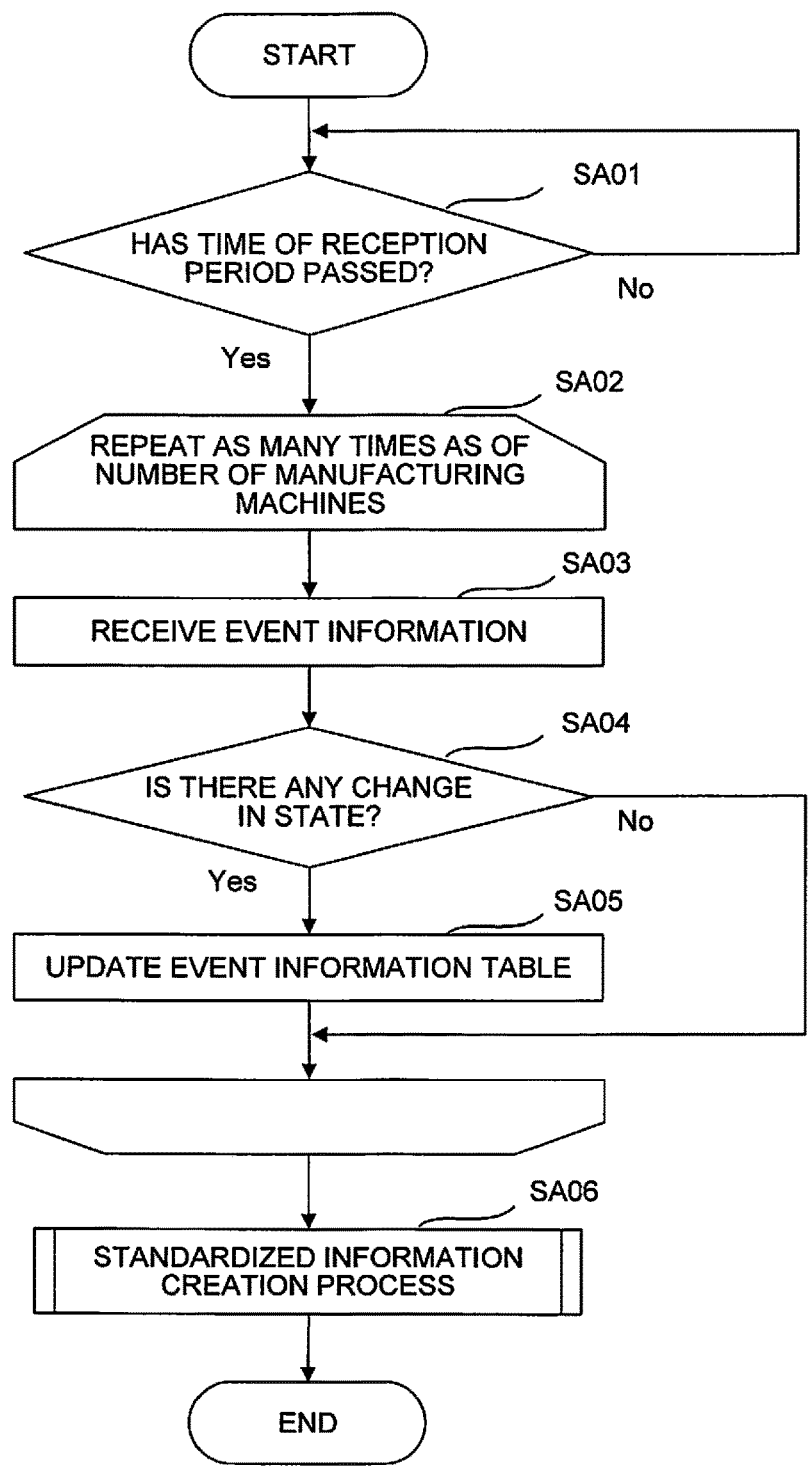
FIG. 6 is a flowchart showing a flow of an event information monitoring process executed by an event information monitoring part in the cell control system in FIG. 1.

FIG. 6 is a flowchart showing a flow of an event information monitoring process executed by the event information monitoring part 16. Hereinafter, a description will be given according to each step.

[Step SA01] The event information monitoring part 16 determines whether or not the time of a reception period has passed from the last time of reception of the event information. If the time of the reception period has already passed, the process proceeds to step SA02, and if the time of the reception period has not passed, the process of step SA01 is repeated.

[Step SA02] The event information monitoring part 16 executes the processes of step SA03 to step SA05 repeatedly for each manufacturing machine 21 provided to the manufacturing cell 20 to be monitored.

[Step SA03] The event information monitoring part 16 receives the event information from the target manufacturing machine 21.

[Step SA04] The event information monitoring part 16 determines whether or not there is a change in the state of the manufacturing machine 21 based on the event information received in step SA03. When there is any change in the state of the manufacturing machine 21, the process proceeds to step SA05, and when there is no change, the process proceeds to the next processing of the manufacturing machine 21.

[Step SA05] The event information monitoring part 16 stores the event information indicating the change in the state of the manufacturing machine 21 determined in step SA04 into the event information table 130 on the storage device 13, to thereby update the event information.

[Step SA06] The event information monitoring part 16 issues a command to the standard information creation part 17 to execute a standardized information creation process for creating the standardized event information from the event information stored in the event information table 130.

Figure 7:
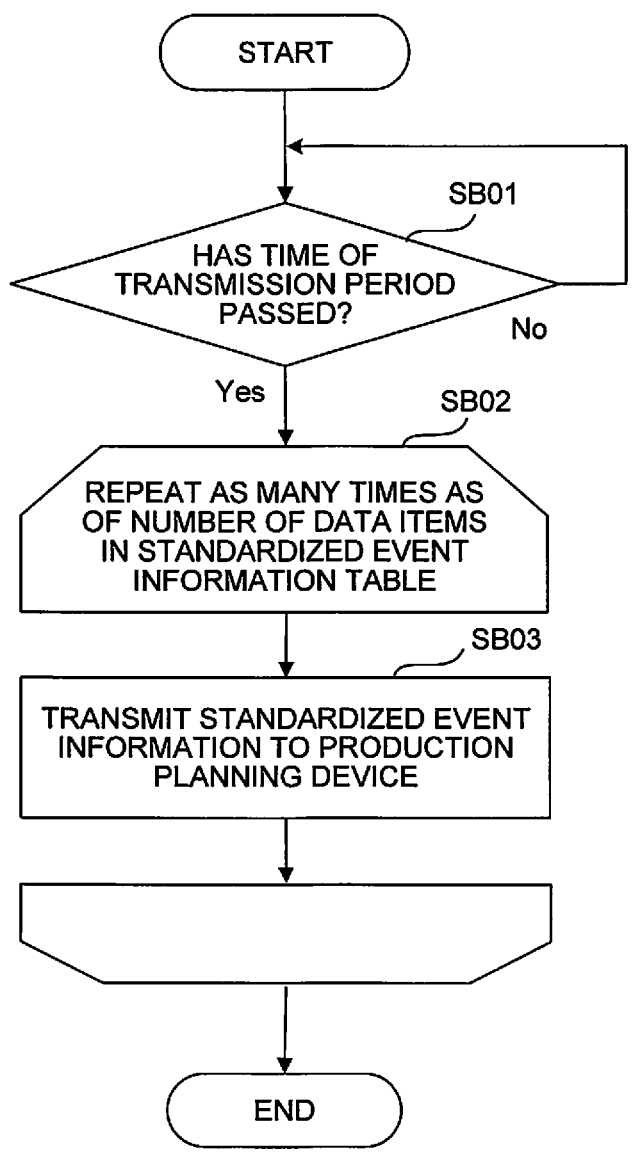
FIG. 7 is a flowchart showing a flow of a standardized information output process executed by a standard information output part in the cell control system in FIG. 1.

FIG. 7 is a flowchart showing a flow of a standardized information output process executed by the standard information output part 18. Hereinafter, a description will be given according to each step.

[Step SB01] The standard information output part 18 determines whether or not the time of a transmission period has passed from the last time of transmission of the event information. If the time of the transmission period has already passed, the process proceeds to step SB02, and if the time of the transmission period has not passed, the process of step SB01 is repeated.

[Step SB02] The standard information output part 18 repeatedly executes a process of step SB03 on each standardized event information item registered in the standardized event information table 133.

[Step SB03] The standard information output part 18 transmits the target standardized event information to the production planning device 30.

Figure 8:
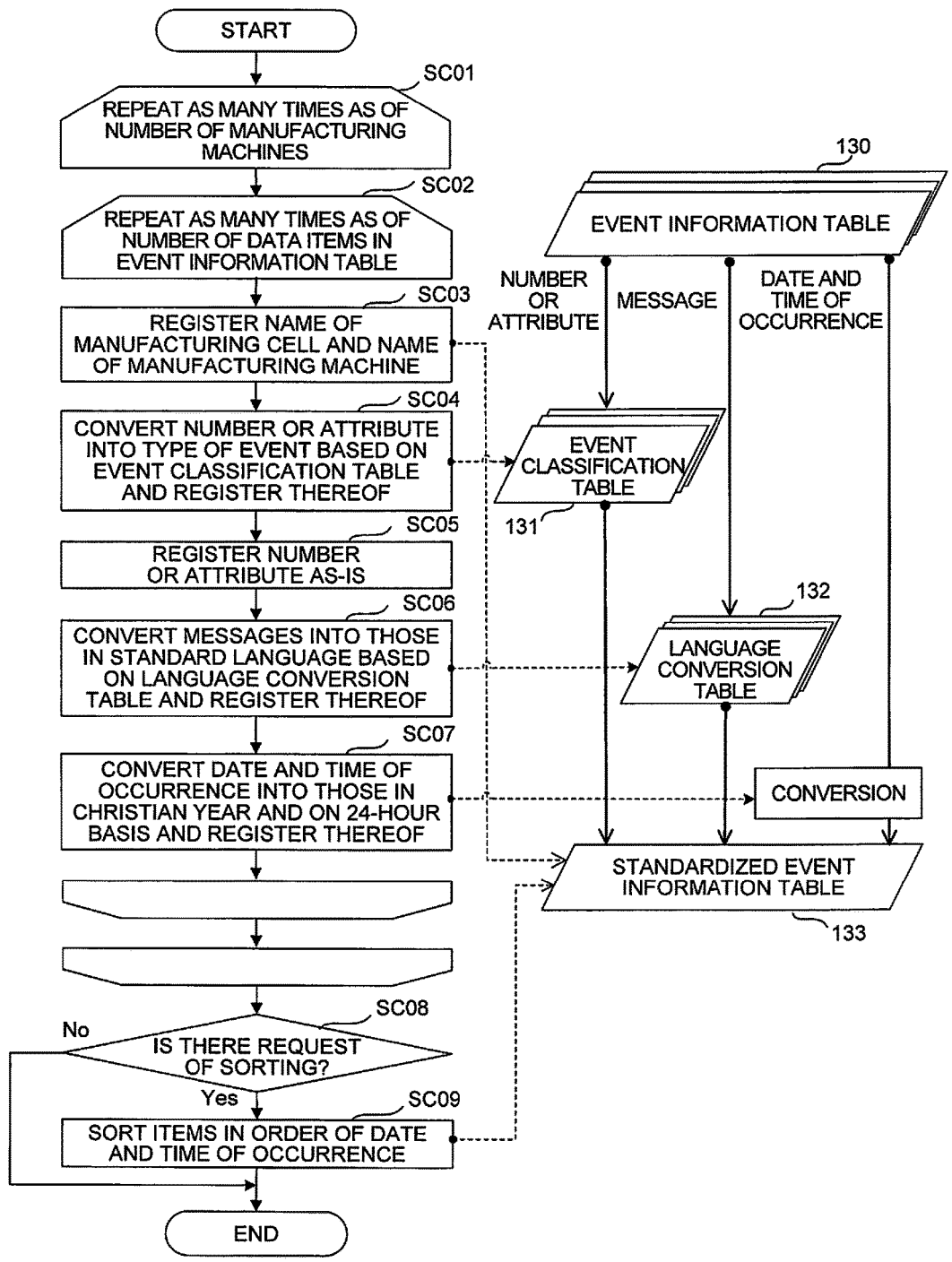
FIG. 8 is a flowchart showing a flow of a standardized information creation process executed by a standard information creation part in the cell control system in FIG. 1.
Figure 9:
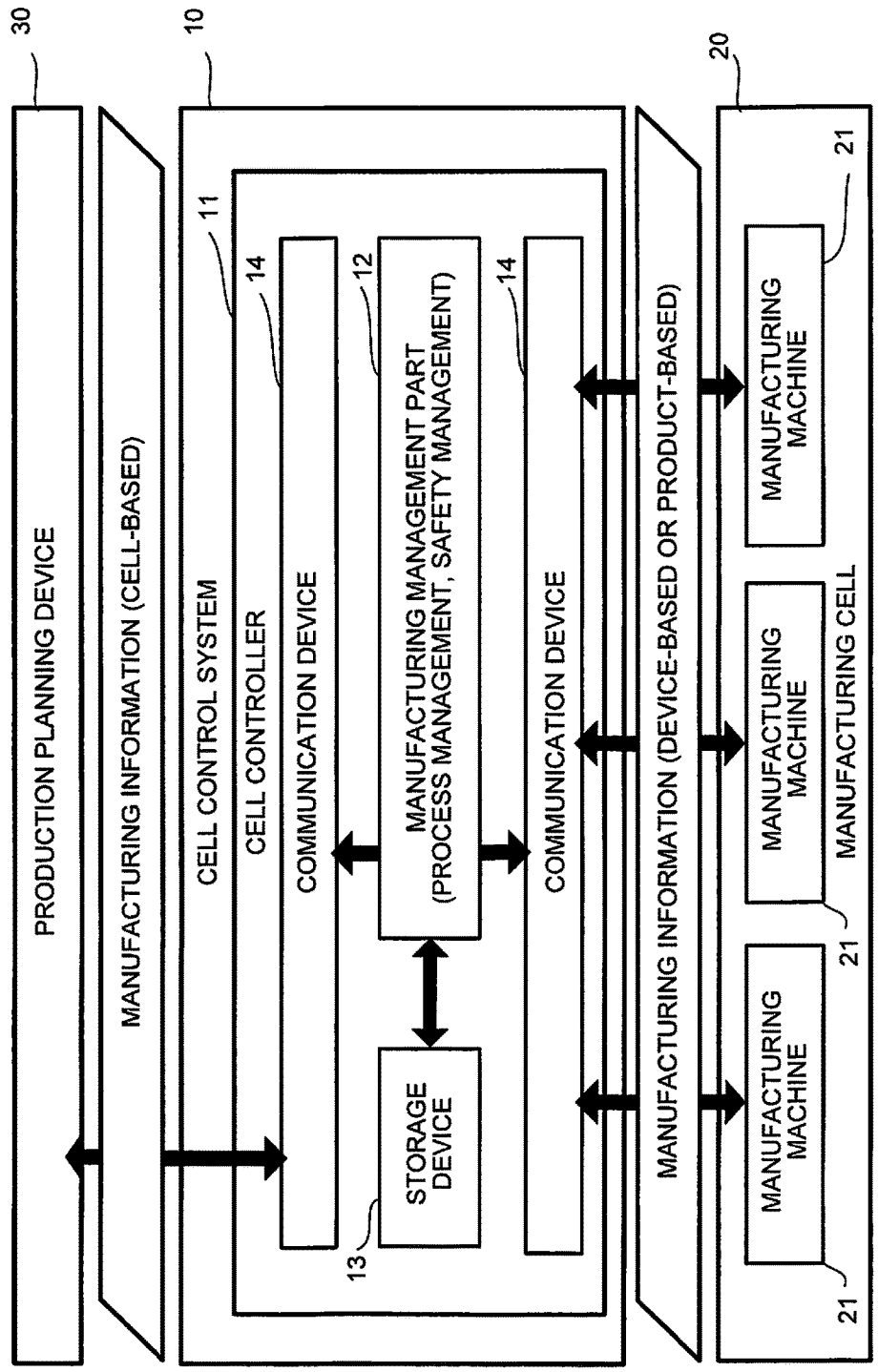
FIG. 9 is a schematic configuration view of an example of a cell control system according to a conventional art.

FIG. 8 is a flowchart showing a flow of a standardized information creation process executed by the standard information creation part 17. Hereinafter, a description will be given according to each step.

[Step SC01] The standard information creation part 17 repeatedly executes processes of step SC02 to step SC07 on the manufacturing machine-based event information table stored in the storage device 13.

[Step SC02] The standard information creation part 17 repeatedly executes processes of step SC03 to step SC07 on each event information item registered in the target event information table 130.

[Step SC03] The standard information creation part 17 registers the name of the manufacturing cell and the name of the manufacturing machine included in the target event information in the standardized event information table 133.

[Step SC04] The standard information creation part 17 converts the number or attribute data included in the target event information into the type of the event based on the event classification table 131, and registers the type of the event in the standardized event information table 133.

[Step SC05] The standard information creation part 17 registers the number or attribute data included in the target event information in the standardized event information table 133.

[Step SC06] The standard information creation part 17 converts the message data included in the target event information into the message in the standard language based on the language conversion table 132, and registers the message in the standard language in the standardized event information table 133.

[Step SC07] The standard information creation part 17 converts the date and time of occurrence included in the target event information into the standardized form (for example, in the Christian year or on a 24-hour basis), and registers the standardized form in the standardized event information table 133.

[Step SC08] The standard information creation part 17 determines whether the setting, in which the standardized event information items, registered in the standardized event information table 133, are to be sorted based on the date and time of occurrence, is made or not. When such a setting of sorting is made, the process proceeds to step SC09, and when such a setting of sorting is not made, the process is terminated.

[Step SC09] The standard information creation part 17 sorts the standardized event information items registered in the standardized event information table 133 based on the date and time of occurrence.

The description of embodiment according to the present invention has been provided above; however, the present invention is not limited only to the above-described examples of embodiment, and is able to be practiced in various modes by adding appropriate modifications.

The invention claimed is:

1. A state change management system of a manufacturing cell in a cell control system, wherein
the cell control system is connected via a communication device to a manufacturing cell composed of multiple manufacturing machines including at least one of a robot, a PLC (Programmable Logic Controller), and a machine tool for manufacturing a product, and is connected via the communication device to a computer that performs production planning of the product manufactured by the manufacturing cell, thereby carrying out manufacturing management by transmission and reception of manufacturing information with the manufacturing cell and the computer, and
the state change management system comprises:
a processor configured to
receive, from the manufacturing cell, event information items in different forms generated from the multiple manufacturing machines, the event information items including at least one of an alarm, a warning and a change in machining condition,
determine whether or not there is a state change in the multiple manufacturing machines based on the received event information items,
execute a process of converting the received event information items in the different forms into a standardized form, the process including a process of standardizing formats and a process of standardizing languages, and
output event information in the standardized form to the computer.

2. The state change management system according to claim 1, wherein the processor is configured to receive the event information items generated at a constant period in each of the manufacturing machines, and update an event information table for each of the manufacturing machines.

3. The state change management system according to claim 1, further comprising a memory configured to store an event classification table and a language conversion table.

4. The state change management system according to claim 3, wherein the processor is configured to convert number or attribute data included in the received event information items into a type of an event based on the event classification table, and register the type of the event in the standardized form.

5. The state change management system according to claim 3, wherein the processor is configured to convert message data included in the received event information items into a message based on the language conversion table, and register the message in the standardized form.

6. The state change management system according to claim 1, wherein the processor is configured to
convert date and time of occurrence included in the received event information items into a standardized date and time;
register the standardized date and time; and
sort the event information in the standardized form based on the standardized date and time.

* * * * *